US012686460B1

(12) United States Patent

Kim

(10) Patent No.: US 12,686,460 B1
(45) Date of Patent: Jul. 21, 2026

(54) TRICYCLE HAVING TILTABLE HANDLEBAR

(71) Applicant: Yong N Kim, Bayside, NY (US)

(72) Inventor: Yong N Kim, Bayside, NY (US)

( * ) Notice: Subject to any disclaimer, the term of this patent is extended or adjusted under 35 U.S.C. 154(b) by 0 days.

(21) Appl. No.: 19/385,578

(22) Filed: Nov. 11, 2025

(51) Int. Cl.
*B62K 5/10* (2013.01)
*B62K 5/06* (2006.01)
*B62K 21/02* (2006.01)
*B62L 3/02* (2006.01)
*B62M 1/36* (2013.01)
*B62M 9/04* (2006.01)
*B62M 25/00* (2006.01)

(52) U.S. Cl.
CPC .................. *B62K 5/10* (2013.01); *B62K 5/06* (2013.01); *B62K 21/02* (2013.01); *B62M 1/36* (2013.01); *B62M 9/04* (2013.01); *B62L 3/02* (2013.01); *B62M 25/00* (2013.01)

(58) Field of Classification Search
CPC . B62K 5/10; B62K 5/06; B62K 21/02; B62M 1/36; B62M 9/04; B62M 25/00; B62L 3/02

See application file for complete search history.

(56) References Cited

U.S. PATENT DOCUMENTS 2,819,093 A * 1/1958 Geiser .................... B62D 61/08
                                        280/282
2,863,672 A * 12/1958 Murata .................. B62K 25/26
                                        280/283
3,309,097 A * 3/1967 Seeber ................... B62D 49/08
                                        180/41
3,583,727 A * 6/1971 Wallis .................... B62D 61/08
                                        180/215
3,858,665 A * 1/1975 Winker ................... C09K 8/60
                                        172/816
3,873,079 A * 3/1975 Kuus ......................... F16F 1/32
                                        267/162
3,880,449 A 4/1975 Wada
3,981,516 A 9/1976 Haggkvist
4,003,443 A * 1/1977 Boughers ................ B62K 5/10
                                        180/361
4,058,181 A * 11/1977 Buell ..................... B62K 25/26
                                        180/227
4,064,957 A * 12/1977 Parham ................. B62K 11/00
                                        180/215
4,159,752 A * 7/1979 Kanno ................... B62K 5/025
                                        280/282
4,429,760 A 2/1984 Koizumi
4,432,561 A 2/1984 Feikema
4,484,648 A * 11/1984 Jephcott .............. B60G 21/007
                                        280/6.15

(Continued)

*Primary Examiner* — Timothy Wilhelm
(74) *Attorney, Agent, or Firm* — PARK LAW FIRM

(57) ABSTRACT

In the conventional tricycle, between the front frame and the bottom bracket which carries the pedal assembly, a joint is inserted that the front frame and the handlebar may tilt to the left or right. By holding the handlebar, the rider can tilt his upper body to cancel out the centrifugal force that occurs during turning and pushes him to the opposite direction of the handlebar causing a fall down accident. Between the front frame and the seat tube is installed a tiltable angle of the handlebar variable system that is remotely operated from the handlebar so that the rider can vary the tiltable angle of the handlebar for safe ride at low speeds or high speeds.

2 Claims, 2 Drawing Sheets

(56) References Cited

U.S. PATENT DOCUMENTS

| | | | | |
|---|---|---|---|---|
| 4,592,441 | A * | 6/1986 | Marier | B62K 5/06 |
| | | | | 280/62 |
| 4,634,137 | A | 1/1987 | Cocksedge | |
| 4,647,053 | A * | 3/1987 | Kanno | B62D 37/00 |
| | | | | 280/6.154 |
| 4,666,018 | A * | 5/1987 | Shibuya | B60G 11/225 |
| | | | | 180/213 |
| 4,671,525 | A * | 6/1987 | Ribi | B62M 9/16 |
| | | | | 180/227 |
| 4,743,102 | A | 5/1988 | Pareigat | |
| 4,887,829 | A * | 12/1989 | Prince | B60G 21/05 |
| | | | | 280/282 |
| 4,968,010 | A * | 11/1990 | Odobasic | B60G 11/48 |
| | | | | 267/141.1 |
| 5,240,267 | A * | 8/1993 | Owsen | B62K 5/02 |
| | | | | 280/282 |
| 5,390,903 | A * | 2/1995 | Fidziukiewicz | F16F 1/32 |
| | | | | 267/28 |
| 5,611,555 | A * | 3/1997 | Vidal | B62D 9/02 |
| | | | | 280/282 |
| 5,678,835 | A | 10/1997 | Sung et al. | |
| 5,730,453 | A * | 3/1998 | Owsen | B62K 5/02 |
| | | | | 280/282 |
| 5,941,548 | A * | 8/1999 | Owsen | B62K 5/10 |
| | | | | 280/282 |
| 7,097,187 | B2 * | 8/2006 | Walters | B62K 5/06 |
| | | | | 280/124.128 |
| 7,204,333 | B2 * | 4/2007 | Kuroki | B62K 5/027 |
| | | | | 180/375 |
| 7,607,640 | B2 * | 10/2009 | Kindersley | F16K 31/465 |
| | | | | 74/89.21 |
| 7,731,210 | B2 * | 6/2010 | Pedersen | B62K 5/05 |
| | | | | 180/209 |
| 8,376,372 | B2 * | 2/2013 | Kanou | B62K 5/05 |
| | | | | 280/5.509 |
| 8,500,108 | B2 * | 8/2013 | Rode | F16F 1/32 |
| | | | | 267/260 |
| 8,596,660 | B2 * | 12/2013 | Hsu | B62K 5/10 |
| | | | | 280/5.509 |
| 8,915,323 | B2 * | 12/2014 | Tsujii | B62K 5/06 |
| | | | | 180/312 |
| 8,919,751 | B2 * | 12/2014 | Kneidel | F16F 3/02 |
| | | | | 192/214.1 |
| 9,248,857 | B2 * | 2/2016 | Spahl | B62D 9/02 |
| 9,321,472 | B2 * | 4/2016 | Yadan | B62K 5/05 |
| 9,381,785 | B2 * | 7/2016 | Gale | B62K 25/18 |
| 9,708,005 | B2 * | 7/2017 | Reusser | B60G 21/007 |
| 9,994,277 | B2 * | 6/2018 | Malphettes | B60G 3/20 |
| 10,023,019 | B2 * | 7/2018 | Spahl | B60G 21/05 |
| 10,843,759 | B2 * | 11/2020 | Hirakawa | B62K 5/027 |
| 11,137,045 | B2 * | 10/2021 | Gandhi | F16F 1/32 |
| 11,565,763 | B1 * | 1/2023 | Gilmore | B62J 1/02 |
| 12,534,109 | B2 * | 1/2026 | McLean | B60L 8/003 |
| 12,576,935 | B1 * | 3/2026 | Kim | B62K 5/10 |
| 2004/0094931 | A1 | 5/2004 | Ackley | |
| 2006/0060400 | A1 * | 3/2006 | Iwashita | B62K 25/20 |
| | | | | 180/220 |
| 2006/0086555 | A1 * | 4/2006 | Dower | B62K 5/10 |
| | | | | 280/282 |
| 2007/0152422 | A1 * | 7/2007 | Lin | B62K 5/10 |
| | | | | 280/275 |
| 2011/0175321 | A1 | 7/2011 | Kuboyama | |
| 2011/0254238 | A1 * | 10/2011 | Kanou | B62K 5/027 |
| | | | | 280/5.509 |
| 2012/0104722 | A1 | 5/2012 | Gunderson | |
| 2013/0068550 | A1 * | 3/2013 | Gale | B60G 3/14 |
| | | | | 280/5.509 |
| 2013/0193668 | A1 | 8/2013 | Decker | |
| 2013/0221633 | A1 | 8/2013 | Jankura | |
| 2016/0221628 | A1 | 8/2016 | Trifaro | |
| 2021/0269115 | A1 | 9/2021 | Shintani | |
| 2022/0017121 | A1 * | 1/2022 | McLean | B60L 8/003 |
| 2023/0257055 | A1 | 8/2023 | Augustin | |
| 2024/0017787 | A1 | 1/2024 | Knapp | |
| 2024/0246630 | A1 * | 7/2024 | Raffaelli | B62K 5/08 |

* cited by examiner

TRICYCLE HAVING TILTABLE HANDLEBAR

BACKGROUND OF THE INVENTION

This invention is related to a tricycle, particularly having a tiltable handlebar. A three-wheeled tricycle is safe and will not fall down during a slow ride or stopping. That is because of the front wheel, two rear wheels are placed on a triangle line of the ground. But when the rider turns the handlebar to change direction, all three wheels make circular tracks on the ground. However, the rider's weight center tends to move straight by the inertia. Therefore, his weight center shifts to the opposite direction of the handlebar, causing a falling down accident. This force that pushes him to the opposite direction of the handlebar is known as the centrifugal force.

One of prior arts presenting the way to eliminate such an unwanted centrifugal force during turning is U.S. patent Ser. No. 12/377,931 of Kim. In the prior art, the handlebar and the seat tube are tiltable to the left or right so that the rider can cancel out the centrifugal force during turning. And the tension spring protects the rider from excessive tilting motion and helps him to return the handlebar to vertical direction from the tilted position. But at low speeds, it is hard for the rider to maintain balance because the tension device does not work sufficiently near the mid position to hold the seat tube vertically. Accordingly, the object of the invention is to propose a tricycle that enables the rider to maintain balance at low speeds, and still cancel out the centrifugal force during turning.

SUMMARY OF INVENTION

In the conventional tricycle, a joint is inserted between the front frame and the bottom bracket that carries pedal assembly so that the handlebar is tiltable to the left or right.

When the rider turns the handlebar during turning, because his lower body such as his feet and hip are engaging with the pedal assembly and the seat that are attached to the seat tube and are not tilting, he can tilt easily his upper body with the handlebar to the same direction of the handlebar and thereby can cancel out the centrifugal force though not cancelling sufficiently as the prior art above. In order to cancel out the centrifugal force sufficiently and to maintain balance at low speeds comfortably, a tiltable angle of the handlebar variable system is provided on the front frame and operated from the handlebar. By varying the tiltable angle of the handlebar, the rider can easily maintain balance at low speeds, or turn safely at high speeds.

DETAILED DESCRIPTION OF THE INVENTION

Figure 1:
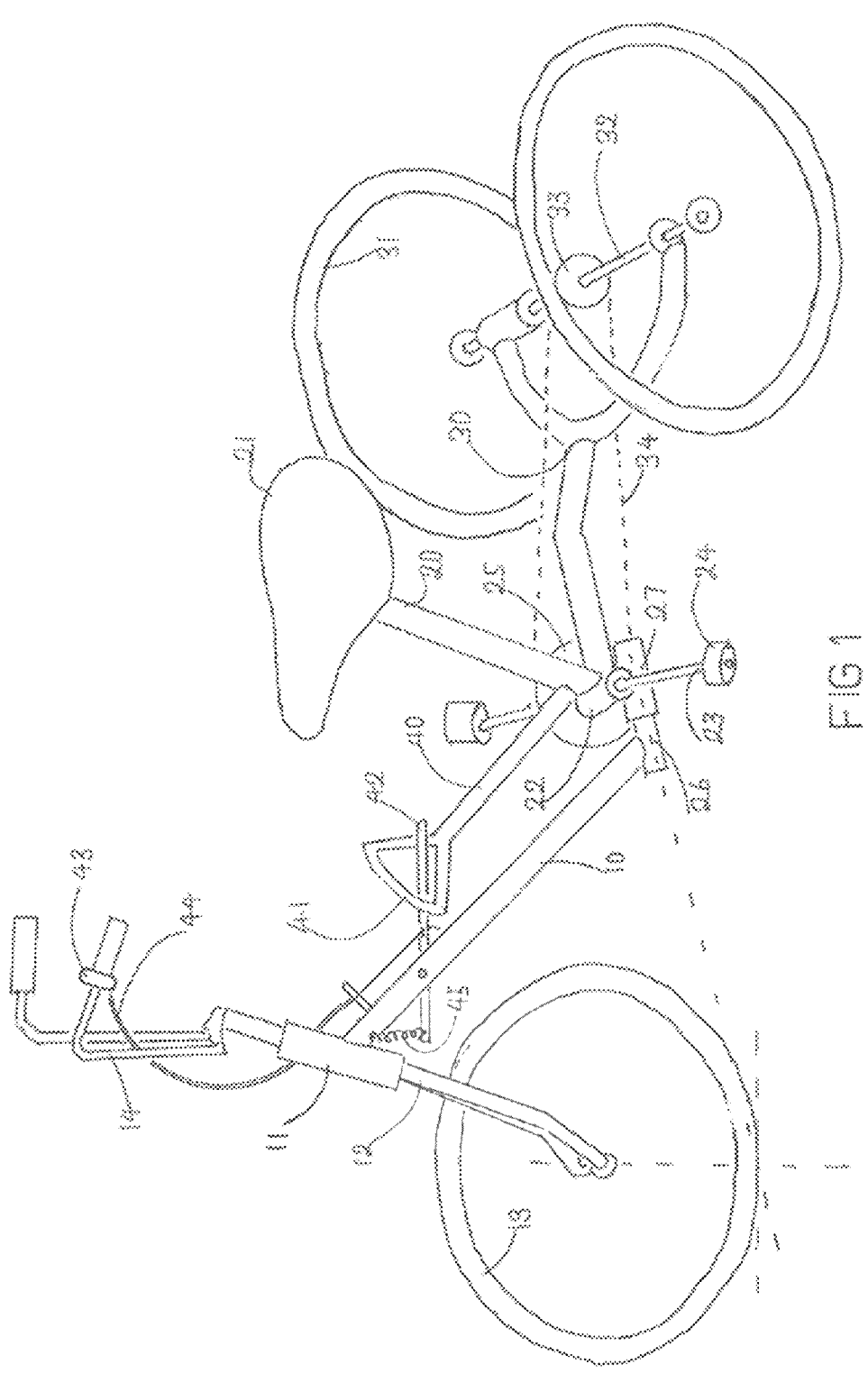
FIG. 1 is the perspective side-view of the preferred embodiment of the invention.
Figure 2:
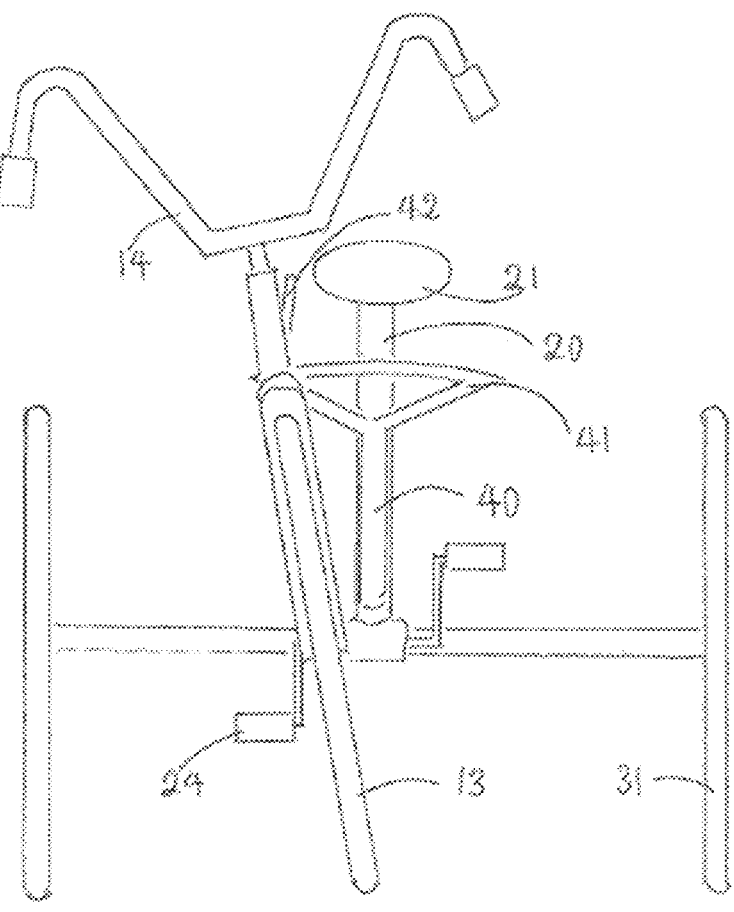
FIG. 2 is the front view of the embodiment.

In FIG. 1, the medial seat tube 20 is attached to the bottom bracket 22. The seat 21 is attached to the seat tube 20 at the upper position. The pedal assembly 23 that comprises the pedals 24 and the cranking sprocket wheel 25 is rotatably attached to the bottom bracket 22. The rear frame 30 is attached to the bottom bracket 22.

The two rear wheels 31 are attached to the transverse axle 32 at each end. The transverse axle 32 is rotatably attached to the rear frame 30. The rear sprocket wheel 33 is attached to the transverse axle 32.

An endless chain belt 34 is mounted on the cranking sprocket wheel 25 and rear sprocket wheel 33 to transmit rotational motion of the pedal assembly 23 to the one of the two rear wheels 31 for propelling. The other rear wheel 31 is idling to compensate for the speed difference between two rear wheels 31.

The front frame 10 is attached to the head tube 11. The front fork 12 is rotatably attached to the head tube 11 for rotation therein. The front wheel 13 is attached to the front fork 12. The handlebar 14 is attached to the front fork 12 at upper position thereof for the rider to steer the front wheel 13 thereby.

The rear end of the front frame 10 is attached to a round, front connecting frame 26. The cylindrical, rear connecting frame 27 is longitudinally attached to the bottom bracket 22 underside thereof. The round, front connecting frame 26 is rotatably attached to the rear connecting frame 27 to rotate around the longitudinal axis of the rear connecting frame 27. Thereby the handlebar 14 becomes tiltable to the left or right but not the seat tube 20.

It is obvious that the round, front connecting frame 26 and the cylindrical, rear connecting frame 27 are switchable to each other without making any difference. By holding the handlebar firmly, it is possible for the rider to maintain balance at low speeds as mentioned earlier. But for safety at low speeds, the tiltable angle of the handlebar 14 variable system is provided. The system comprises a triangular frame 41 attached to the extension frame 40 of the seat tube 20, a longitudinal bar frame 42 swingably attached to the front frame 10 and swinging up and down in the triangular frame 41, the hand lever 43 attached to the handlebar for remotely swinging the longitudinal bar frame 42 up or down, a driveline 44 linking the hand lever 43 and the longitudinal bar frame 42. The hand lever 43 has the structure of the brake lever or the derailleur twist shifter lever of bicycles.

The longitudinal bar frame 42 is normally at its lowest position in the triangular frame 41 by the tension spring 45. By operating the hand lever 43, the rider can swing the bar frame 42 up or down, and in turn can vary the tiltable angle of the handlebar 14 as needed particularly for low speed riding. It is obvious that the triangular frame 41 and the longitudinal bar frame 42 are switchable to each other without making any difference.

What is claimed is:

1. A tricycle comprising a front wheel, a front frame, a seat tube, a rear frame, two rear wheels, a seat attached to the seat tube at un upper end position thereof, a bottom bracket attached to the seat tube at a lower end position thereof, a pedal assembly rotatably attached to the bottom bracket, a cranking sprocket wheel attached to the pedal assembly, the two rear wheels being attached to a transverse axle at each end thereof, a rear sprocket wheel attached to the transverse axle, the transverse axle being rotatably attached to the rear frame, the rear frame being attached to the bottom bracket, an endless chain belt linking the cranking sprocket wheel and the rear sprocket wheel, the front frame being attached to a head tube, a front fork rotatably attached to the head tube for rotation therein, the front wheel being attached to the front fork, a handlebar attached to the front fork at an upper end thereof for a rider to steer the front wheel thereby, the rear end of the front frame being attached to a front connecting frame, the bottom bracket being attached to a rear connecting frame, the front connecting frame being rotatably attached to the rear connecting frame to rotate around a longitudinal axis of the rear connecting frame, whereby the tricycle is configured such that the rider can tilt the handlebar to the left or right to shift his upper body to cancel out the centrifugal force that occurs during turning and pushes him to opposite direction of the handlebar causing a fall down accident, and the tricycle further comprising a tiltable angle of the handlebar variable system, the system comprising a triangular frame attached to an upstanding extension frame of the seat tube, a longitudinal bar frame swingably attached to the front frame, the longitudinal bar frame being swinging up and down in the triangular frame, a hand lever attached to the handlebar to make the longitudinal bar frame to swing, a driveline linking the hand lever and the longitudinal bar frame, whereby the tricycle is configured such that the rider can operate the hand lever to swing the longitudinal bar frame up or down and vary the tiltable angle of the handlebar as needed for safety depending on riding speeds.

2. The tricycle of claim 1, wherein the hand lever has a structure of a brake lever or a derailleur twist shifter lever of a bicycle.

\* \* \* \* \*